(No Model.)  3 Sheets—Sheet 1.

A. W. MITCHELL.
BRAKE AND POWER CONTROLLER FOR ELECTRIC CARS.

No. 531,268.  Patented Dec. 18, 1894.

WITNESSES:
Leona Centa Ames
George B. Kelly

INVENTOR:
Andrew W. Mitchell
Per Edwin W. Brown.
ATTY.

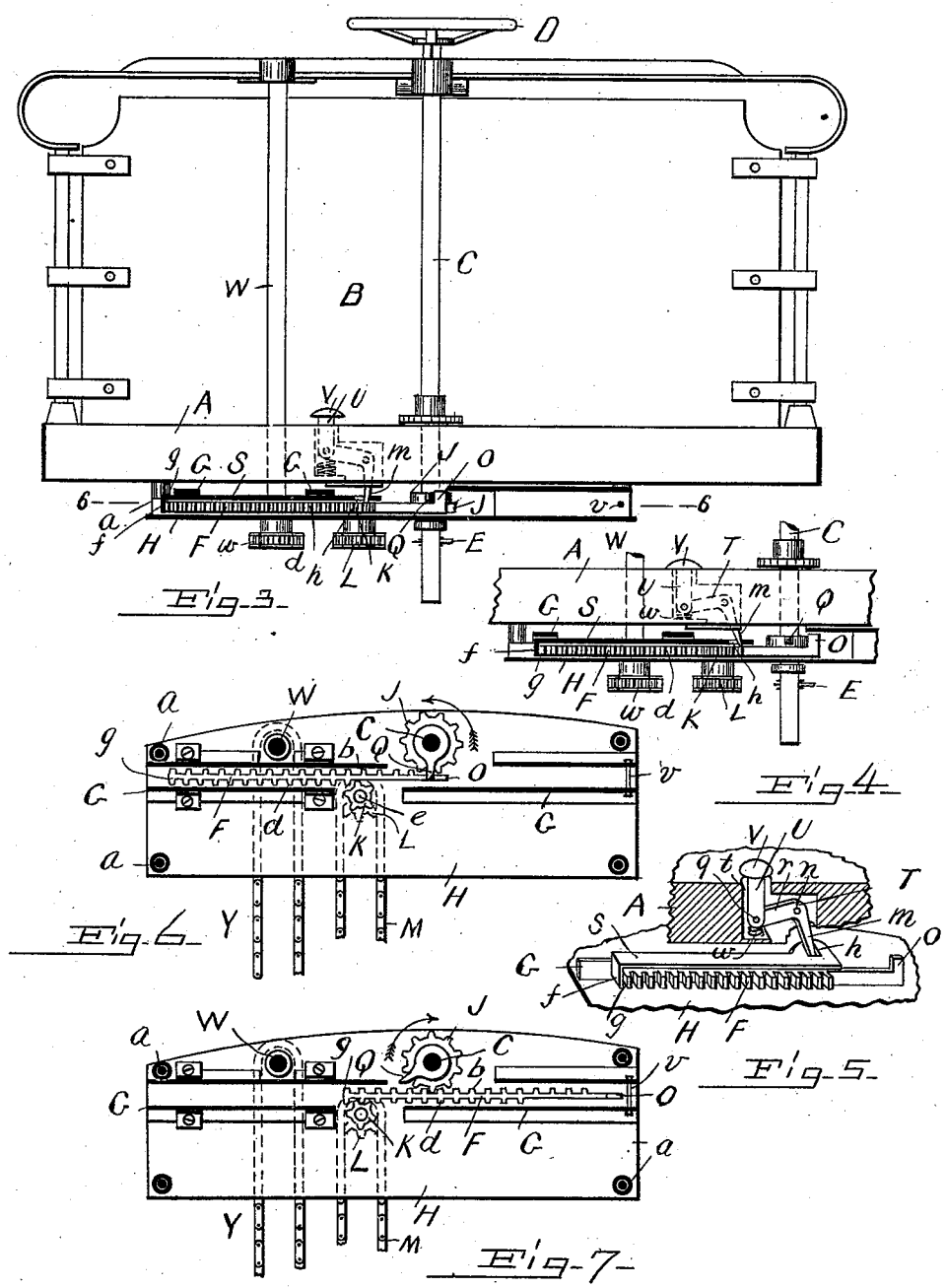

(No Model.)  3 Sheets—Sheet 3.

A. W. MITCHELL.
BRAKE AND POWER CONTROLLER FOR ELECTRIC CARS.

No. 531,268. Patented Dec. 18, 1894.

UNITED STATES PATENT OFFICE.

ANDREW W. MITCHELL, OF BOSTON, MASSACHUSETTS.

BRAKE AND POWER CONTROLLER FOR ELECTRIC CARS.

SPECIFICATION forming part of Letters Patent No. 531,268, dated December 18, 1894.

Application filed January 22, 1894. Serial No. 497,683. (No model.)

*To all whom it may concern:*

Be it known that I, ANDREW W. MITCHELL, of Boston, in the county of Suffolk and State of Massachusetts, have invented certain new and useful Improvements in Brake and Power Controllers for Electric Cars, &c., of which the following is a full, clear, and exact description.

The object of the present invention is to combine the mechanism for operating the electric current in an electric car or other vehicle with the brake apparatus, so that both the electric current mechanism and the brake can be controlled by using one crank, which may be operated with a handle or wheel by one or both hands, so that, as the motorman operates the same to stop the car, it will at the same time move the mechanism to break the electric circuit, and stop the operation of the electric motor. As he releases the brake the electric circuit will again be made and the power of the electric motor applied to the car or vehicle with no more care or thought on the part of the motorman than if he was driving a horse-car; and the invention consists in an electric car or other vehicle of mechanism so constructed and arranged and connected with the arm or rod of the regular brake of the car that in the operation of the brake rod to brake the car it will not only brake the car and stop its movement, but will also shut off or cause the electric current to be broken, and thus stop the electric motor, and in reversing the movement of the brake rod to release the brake, it will also operate the electric mechanism to make the electric circuit, and operate the electric motor all substantially as hereinafter fully described reference being had to the accompanying sheet of drawings in which is illustrated the present invention as applied to an electric car.

Figure 1:
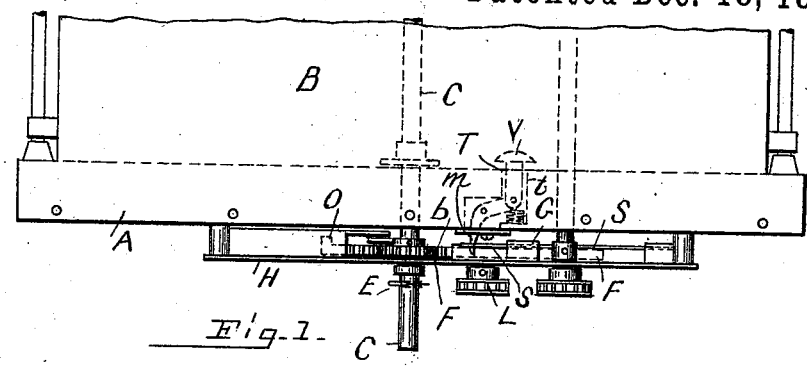
Figure 2:
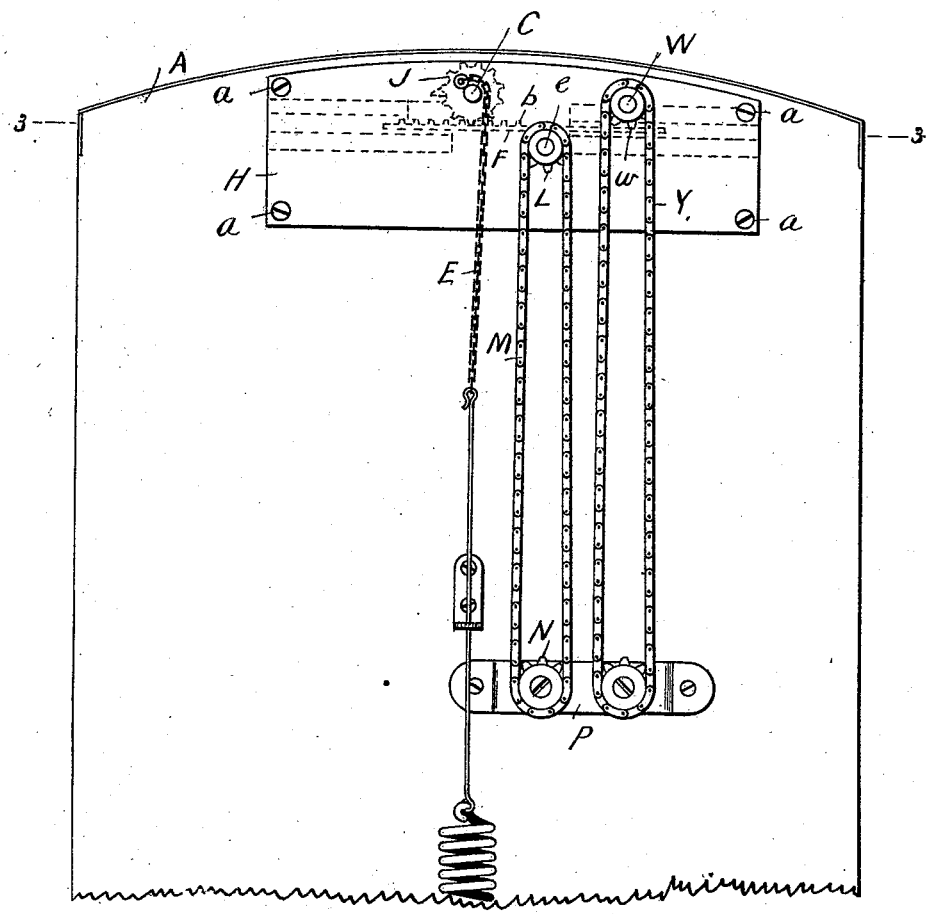
Figure 8:
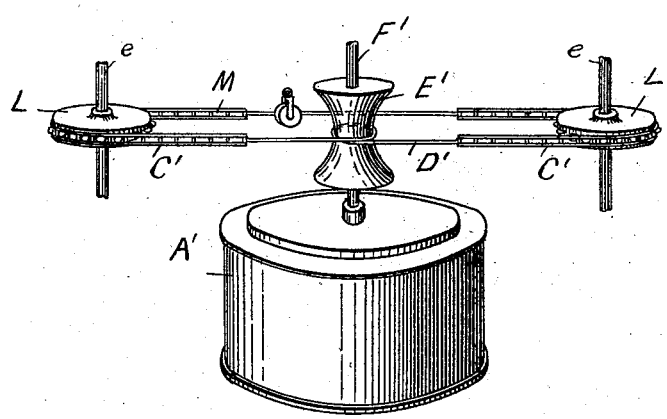

Figure 1, is a detail view of the end of a street railway car showing this invention as applied to the car. Fig. 2, is an under plan view of such end of the car. Fig. 3, is an elevation of the inner side of the dasher of the car with the other parts in vertical section on line 3—3 Fig. 2. Fig. 4, is a detail view of some of the parts shown in Fig. 3 but in different positions. Fig. 5, is a view in perspective of the parts shown in Fig. 4. Fig. 6, is a plan view of the operating parts below the platform of the car on horizontal section line 6—6 Fig. 3. Fig. 7, is a plan view of the parts in Fig. 6, but showing the parts in different positions. Fig. 8 is a perspective view of the manner of connecting the brake rod with the electric motor mechanism.

In the drawings, A represents a platform of a street railway car; B, the dasher; C, the brake rod having a wheel handle D, adapted to turn in suitable bearings in the dasher and platform, and having a chain E, which is connected to the brake of the car not shown, all of which is substantially as usual in street cars and needing no more particular description herein.

F, is a rack bar having teeth on both edges and it is adapted to slide back and forth in guideways G in a frame H secured to the under side of the platform by bolts or screws a. The rack bar by its teeth b on one side engages with a gear J rigidly attached to the brake rod C below the platform and by its teeth d, on the opposite side engages with a gear K, secured to journals e, adapted to turn in bearings in the frame H, and having a sprocket wheel L secured thereto with which engages an endless chain M which in turn engages with another sprocket wheel N having journals adapted to turn in a suitable support P secured to the under side of the platform. This sprocket wheel N can be on the shaft of the rheostat or switch mechanism of the electric motor, or the chain M can be connected to such mechanism in any suitable manner. On one end of the rack bar is an upward projection or lug O which at certain times is in position to be operated upon or engaged with a horizontal lug or projection Q on the brake rod above the gear.

In operating the brake rod to brake the car, through its gear J the rack bar F will be moved to the left, and stops when its teeth b become disengaged from the brake rod gear, and in such position the wheel connected by chain M to the rheostat of the electric motor will have moved sufficiently to have broken the circuit and consequently have stopped the motor, and as the brake rod is operated in the opposite direction to release the brake, its lug Q bears against the lug O on the rack bar and moves the bar along sufficiently for its teeth b to again engage with brake rod gear J and be moved to the right, and in such movement turn the sprocket wheel L and through its chain M operate the rheostat for the electric motor to move the car.

The operation of the device is as follows: With the car at rest, the brake loose, the parts are in the position shown in Fig. 6, the power from the electric motor being thus shut off, and in such connection the rack bar will not be in connection with the brake rod gear K, but the brake rod will be in position for its lug Q to be at the left but near to the rack bar lug O. To start and run the car, the motorman turns the brake rod by the wheel to the left, bringing its lug Q to bear against the rack bar lug O which moves the rack bar into position for its teeth $b$ to engage with the brake rod gear J which then moves it, and through its chain M connection with the sprocket wheel N or rheostat or electric controller it is operated to put on the power of the electric motor, and thus move the car along. To brake and stop the car, turn the brake rod to the right as usual, which moves the rack bar to the left, and through its gear and chain connection with the rheostat of the motor, the electric circuit is cut off, stopping the electric motor, and in such movement the gear J is disconnected from the rack bar because the teeth $b$ of the bar have passed beyond its connection therewith as shown in Fig. 6, when the brake rod is free to turn without effect on the rack bar, until the brake stops the car. To release the brake the brake rod can be turned sufficiently to relieve the brake without putting on the electric power but when desirous of starting the car the brake rod is still farther turned which then by its lug engages with each bar lug O and moves the rack bar along for its teeth $b$ to engage with the brake rod gear J and in its continued movement the rack bar is also moved communicating motion to the gear K and its chain to the rheostat electric controller and thus operate the electric power and setting the car in motion. Thus the motor-man by simply moving the brake rod handle wheel to the right to brake the car, operates the rheostat to break the electric circuit, stopping the electric motor, and by reversing the movement of the brake rod handle or wheel to release the brake, leaves the car free, and in its continued movement, puts on the electric power, propelling the car, the power being increased within certain limits by the continued movement of the brake rod to the left, and the power being decreased by turning the brake rod to the right, thus accomplishing practically and successfully with the brake rod alone the proper running of the car, and what now has to be accomplished by the brake rod and an extra rod for the electric motor, an advantage which is clearly obvious.

If the car is ascending a hill and has stopped with the brake applied, in releasing the brake to again start the car, for an instant before the rack bar could be moved by the brake rod, the gravity of the car would tend to run it down hill and to obviate this, certain parts are arranged for operation as will now be described.

S is a flat bar arranged to slide back and forth freely over the rack bar having an angular downward projection $f$ at one end which lies over and behind the end $g$ of the rack bar and near its other end has an opening or socket $h$ in which is arranged the downwardly projecting arm $m$ of an angular lever T pivoted at $n$ to the platform, and having pivoted at $q$ to its other arm $r$, a stem or rod U which extends freely up through an opening $t$ in the platform having a head V in position convenient for the motor man to press his foot upon it. Under the rod is a spiral spring $w$ which presses up against the rod to hold it up and the lever in position shown in dotted lines in Fig. 3 and in perspective in Fig. 5. Pressing down the rod moves the lever on its pivot and its arm $m$ by its engagement with the sliding bar moves it forward a sufficient distance for the rack bar to engage with the brake rod gear, so that if then the brake is released it will immediately move the rack bar and through the gear and chain put on the electric power as before described so that in the case of ascending a hill, before the motor-man releases the brake he will push down the rod U and move the rack bar as described, when he will release his brake and thus the power will be applied at once and in time to offset the gravity of the car, preventing the movement of the car down hill. This lever is only to be used after a car has been stopped in ascending a hill and desirous of starting it again. At the end of the guideway is a cross pin $v$ which prevents the rack bar from moving too far in such direction and it is prevented from moving in the other direction by its abutment against the arm $f$ of the slide bar S which is controlled in its movements by the angular lever T. The teeth $d$ of the rack bar arranged to engage the chain gear K do not extend so far on the bar, as the teeth on the other side, so that in turning the brake rod fully to the left, it will have no effect on the rack bar to move the rheostat or electric controller beyond a certain point, which prevents injury to its parts.

W is a vertical rod arranged to turn in suitable bearings in the dasher and platform having a sprocket wheel $w$ on its lower end with which engages a chain Y in turn engaging with the switch mechanism rheostat of the electric motor, for reversing of the same when desired, it being constructed and arranged as usual for operation, and needing no more particular description herein as it is no part of the present invention.

In Fig. 8 is shown the manner of connecting the chain M with the rheostat or electric controller mechanism and in this view A' represents in detail in perspective a rheostat; L the sprocket wheel operated by the rack bar at each end of the car, and connected together by the endless chain M, portions C' of which engage with the two sprocket wheels and the middle portion D' being wound once round a thimble E' secured to the shaft F' of the rheostat, which rheostat can be constructed in any of the well known ways and needing no particular description herein. As either sprocket wheel is operated, it acts through its chain connection with the rheostat shaft to move it in the proper direction to put on or shut off the power of the electric motor. It is not intended however to limit this invention to any particular form or manner of connecting the electric mechanism with the brake rod, as obviously it can be connected in any suitable manner for its proper operation in connection with the brake rod.

Having thus described my invention, what I claim is—

1. In combination, a brake rod of a car, having a handle or wheel, a gear on its lower end, a rack bar arranged to slide back and forth in suitable guideways to engage with said gear, another gear on a suitable support arranged to engage with said rack bar, a sprocket wheel connected to said latter gear or its journal, and a chain engaging with said sprocket wheel and with the rheostat or electric controller of an electric motor.

2. In combination, a brake rod of a car having a handle or wheel, a gear on its lower end, a rack bar having gear teeth on its two opposite sides, arranged to slide back and forth in suitable guideways and to engage by one side with said gear, another gear on a suitable support, arranged to engage with said rack bar on its opposite side, a sprocket wheel connected to said gear or its journal, and a chain engaging with said sprocket wheel and with the rheostat or electric controller of an electric motor.

3. In combination a brake rod of a car having a handle or wheel, a gear on its lower end, a rack bar arranged to slide back and forth in suitable guideways and to engage with said gear an opening or socket in said bar, a gear on a suitable support, arranged to engage with said rack bar, a sprocket wheel connected to said gear or its journal, and a chain engaging with said sprocket wheel and with the rheostat or electric controller of an electric motor, a slide bar adapted to engage with said rack bar, a pivoted lever engaging by one arm with said slide bar and by its other arm with a push rod or spindle extending up through the bottom of the car for operation thereof.

4. In combination, a brake rod of a car, having a handle or wheel, a gear on its lower end, a projection or lug thereon, a rack bar having a projection or lug near one end with which said brake rod lug is adapted to engage arranged to slide back and forth in suitable guideways, and to engage with said gear, a gear on a suitable shaft arranged to engage with said rack bar, a sprocket wheel connected to said gear or its journal, and a chain engaging with said sprocket wheel and with a rheostat or electric controller of an electric motor.

5. In combination, a brake rod of a car having a handle or wheel, a gear on its lower end, a projection or lug on said rod or gear, a rack bar arranged to slide back and forth in suitable guideways, and to engage with said gear, and arranged to engage with said brake rod lug or projection, and the rheostat or electric controller of an electric motor arranged to be connected with said rack bar for operation thereof.

In testimony whereof I have hereunto set my hand in the presence of two subscribing witnesses.

ANDREW W. MITCHELL.

Witnesses:
EDWIN W. BROWN,
LEONA C. ARNO.